United States Patent [19]

Zweifel

[11] 4,233,702
[45] Nov. 18, 1980

[54] FISH TANK ROCK CLEANER

[76] Inventor: Michael R. Zweifel, 2434 4th Ave., Council Bluffs, Iowa 51501

[21] Appl. No.: 67,047

[22] Filed: Aug. 16, 1979

Related U.S. Application Data

[63] Continuation of Ser. No. 5,438, Jan. 22, 1979.

[51] Int. Cl.³ ............................................. E04H 3/20
[52] U.S. Cl. ...................................... 15/1.7; 210/169
[58] Field of Search .................. 15/1.7, 363, 368, 373; 210/169

[56] References Cited

U.S. PATENT DOCUMENTS

| | | | |
|---|---|---|---|
| 2,214,862 | 9/1940 | Riebel, Jr. | 15/737 |
| 2,744,065 | 5/1956 | Lacey | 210/169 |
| 2,899,063 | 8/1959 | Ellis, Jr. | 15/1.7 X |
| 3,360,129 | 12/1967 | Powers | 210/169 |

Primary Examiner—Edward L. Roberts
Attorney, Agent, or Firm—Hiram A. Sturges

[57] ABSTRACT

A fish tank cleaning system comprising a water pump, a hose connected to the water pump, a stone cleaning tool comprising a housing, the lower end of the housing being open to engage rocks on the bottom of an aquarium, a stirring rod moveably extending through the housing for stirring the rocks, the other end of the hose being connected to an outlet of said housing disposed above the bottom of the housing.

1 Claim, 8 Drawing Figures

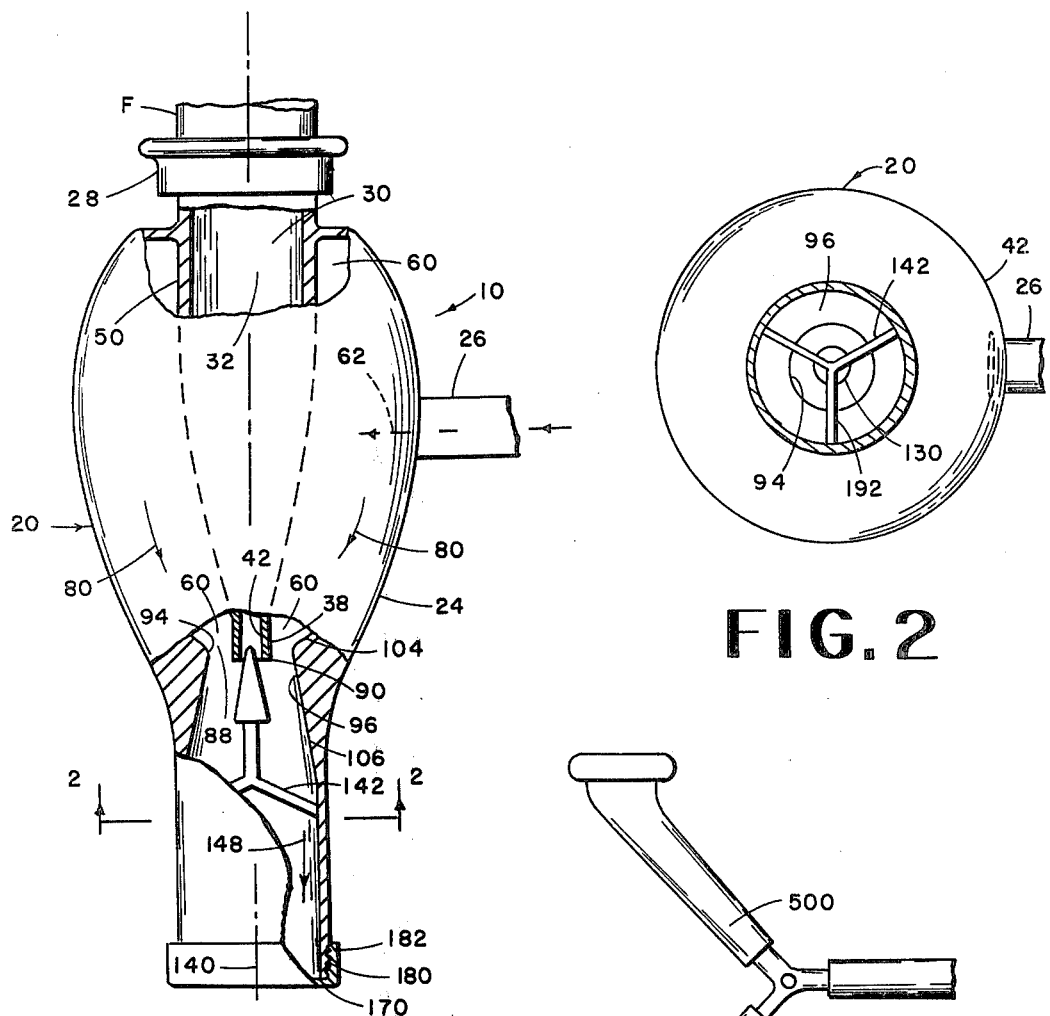
FIG. 2
FIG. 1
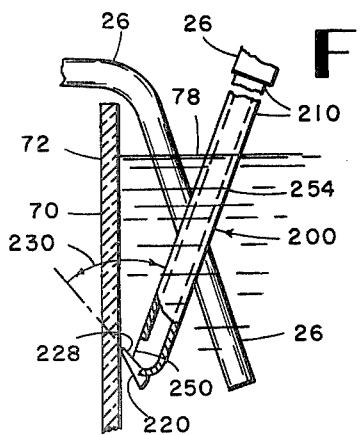
FIG. 4
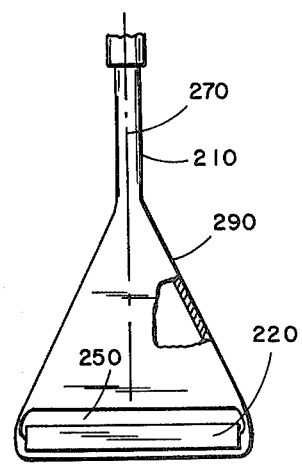
FIG. 3
FIG. 5

– 1 –

FISH TANK ROCK CLEANER

This application is a continuation of Patent Application, titled: FISH TANK CLEANING SYSTEM, Ser. No. 5,438, filed Jan. 22, 1979.

BACKGROUND OF THE INVENTION

This invention is in the field of cleaning systems for aquarium tanks as the cleaning of the rocks on the bottom of the tank has been a great problem.

Therefore, a main object of this invention is to provide a rock-stirring device for stirring the rocks on the bottom of an aquarium to cause the debris to raise therefrom so as to be drawn off by suction through a hose, the suction being applied to a small area for effective results and the area being bounded by the housing of the rock-stirring device, which latter has a stirring rod mounted in it.

SUMMARY OF THE INVENTION

A major goal of this invention is to provide a fish tank cleaning system comprising a water pump, a stone cleaning tool comprising a housing, the lower end of the housing being open to engage rocks on the bottom of an aquarium, a stirring rod moveably extending through the housing for stirring the rocks, the other end of the hose being connected to an outlet of said housing disposed above the bottom of the housing.

BRIEF DESCRIPTION OF THE DRAWINGS

FIG. 1 is a side elevation of a venturi pump of this invention with upper and lower portions of the housing wall broken away to show the interior in cross-section. A cap for the lower end of the pump is shown in place, as it would be if it is intended to deliver water from the pump through a hose to an aquarium. The cap is removed when pumping from the aquarium is desired.

FIG. 2 is a bottom plan view of the pump of FIG. 1.

FIG. 3 is a side elevation of a device now obsolete and so not further described.

FIG. 4 is a side elevation of a squeegee tool in position of use and shown engaging the side of an aquarium, which latter is shown in cross-section, the tool having a portion of its side wall broken away to show its hollow interior. FIG. 4 also shows an example of the position of a hose in an aquarium at a time when the aquarium is either being emptied or filled.

FIG. 5 is a view of the squeegee tool of FIG. 4 as it would be seen looking at its left side at a right angle to its handle.

DESCRIPTION OF THE PREFERRED EMBODIMENT

Figure 6:
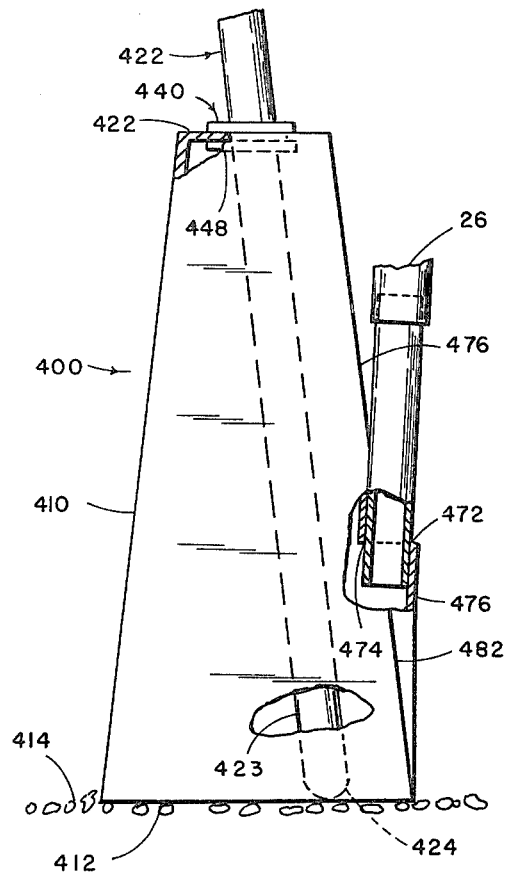
FIG. 6 is a side elevation of the aquarium bottom cleaning tool of this invention showing rocks on the bottom being stirred by the tool, portions of the side wall of the tool being broken away.
Figure 7:
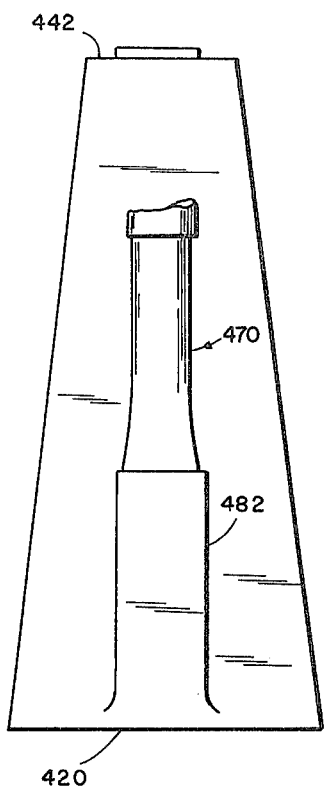
FIG. 7 is a side elevation of the tool of FIG. 6 as seen from the right side, but without the rod showing.

The aquarium servicing system of this invention is generally indicated at 10 in FIG. 1, and comprises a pump as one of its parts, generally indicated at 20, which latter has an outer housing 24, to which a hose 26 of about one-half inch diameter is connected. The outer housing 24 has a coupling 28 attached to it of a type for reception on the faucet of a sink, whereby water from the faucet passes down into the interior of a constricted chamber 30, which has a constricted lower end and an enlarged upper end, the upper end 32 being adapted to receive the terminal end of a faucet therein, so that water from the faucet flows downwardly through the chamber 30 from an inlet port 33.

Since the chamber 30 is of gradually lesser and lesser area as its lower end is approached until a place of maximum constriction 38 is reached the water will, therefore, jet out from the lower end of the chamber 30 with considerable force.

The lower end of the chamber 30 has an inner wall 42 which is of the least horizontal cross sectional area at a point and then once again the area defined by the wall 42 becomes slightly larger in the last approximately one quarter inch or more of the length of the chamber 30.

The hose 26 connects to an inlet opening 43.

The chamber 30 has a wall 50 of which 42 defines the inner surface thereof, or, in other words, the inner surface of the chamber 30.

Between the wall 50 and the outer housing 24 a flow area 60 into which the hose 26 delivers water in the direction of an arrow 62, receiving the water from an aquarium, which latter could be located at a great distance from the pump 20, such as even two or three rooms away from the pump if desired, since the hose 26 can be of any length.

Such an aquarium is shown diagrammatically at 70 in FIG. 4, although it will be seen that only one wall 72 thereof is shown, and the other end 74 of the hose 26 can be seen in FIG. 4, disposed beneath the level of the water 78 in the tank.

Water flowing through the hose 26 from the aquarium is delivered into the flow area 60 and then it is drawn downwardly in the direction of the arrows and through an annular space 88, which latter is disposed between the outer side of the wall 50 at the lower terminal end 90 of the wall 50, and the annular surface of the inner wall 96 of the housing 24.

The annular surface 94 is disposed above the terminal end 90 of the chamber housing 50 and the inner wall 96 of the outer housing 24 is of a greater diameter in horizontal cross-section at the upper end of the flow area 60, and still greater at its center than it is at the annular surface 94 and inner wall 96 tapers inwardly gradually, as seen at 104, as the constricted annular surface 94 is approached from the top and, as seen at 106, the inner wall 96 gradually tapers outwardly to ever larger diameter as the lower end of the outer housing 24 is approached, as would be in horizontaly cross section downwardly from the constricted annular surface 94.

A flow divider 130 extends upwardly into the annular lower end 90 of the inflow chamber 30.

The flow divider 130 is substantially conical shape, having a pointed upper end and becoming larger in horizontal cross section toward its lower end.

The flow divider 130 is maintained centrally along a vertical axis 140 by means of a support structure 142 connected to the lower end of the flow divider 130 and connected to the inner side of the inner wall 96, and the support structure 142 is open for the most part to permit flow of water downwardly there across in the direction of the arrow 148 for flow out the bottom of the flow area 60, which is open during withdrawal of water from an aquarium, such opening being seen at 170, although this opening 170 can also be capped by a cap 180 when it is desired to fill the aquarium from water coming into the pump 20 from a faucet.

The cap 180 is removably secured by threads 182 so as to block flow through the opening 170 when the cap 180 is in place, and this has the effect that water will then flow outwardly through the hose 26 for filling the aquarium 70 of FIG. 4.

The support structure 142 is best seen in FIG. 2, and can be equidistantly spaced support legs 192.

Referring to FIG. 4 a suction squeegee of this invention is generally indicated at 200, and has a hollow handle 210 stiff enough for good control, while using the squeegee blade 220 to clean an inner wall of an aquarium such as the inner side of the wall 72, seen in FIG. 4.

The blade 220 has a surface 228 which generally faces a handle 210, the surface 228 being disposed at an acute angle of approximately 55 degrees with respect to the elongation of the straight handle 210, such angle being seen at 230, whereby the squeegee is effective in loosening algae from the aquarium wall, since the blade 220 is of rubber or of soft plastic with a substantial flexibility and resiliency.

Algae are then drawn with water through an elongated inlet 250 so as to flow upwardly in the direction of the arrow 254 through the hollow handle 200 and from thence through a hose such as the hose 26 which is suitably secured to the upper end of the handle 210 so that the algae are delivered back through the hose 26 and through the pump 20 down into a sink, not shown, below the pump 20.

The handle 210 is connected to an outwardly flared housing 290, as best seen in FIG. 5, so that the blade 220 and the inlet 250 can be of substantially the same length and of much larger transverse dimension than the handle 210 as measured transversely to an axis 270 extending through the handle 210 and at a right angle to the blade 220.

Referring to FIG. 6, an aquarium bottle cleaning tool is there generally shown at 400 and comprising an outer housing 410, having an open lower end 412, whereby the open lower end 412 can be placed onto rocks, shown in dotted lines at 414, at the bottom of an aquarium.

The lower edges 420 of the housing 410 are preferably in a horizontal plane and algae and manure on the rocks 414 can be stirred up by a stirring rod 422, which extends downwardly through a closed top of the housing 410 until the lower end of the rod 422 can be seen at 424 to be in a position for stirring the rocks 414.

The rod 422 extends through an opening 438 in a flexible rubber grommet 440 which connects the rod 422 with the upper wall 422 of the housing 410.

The grommet effectively seals the space between the upper wall 442 at an opening 448 therein and the outer surface of the rod 422.

Figure 8:
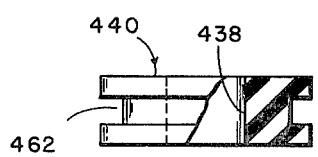
FIG. 8 is a detail showing the grommet of FIG. 6 in frontal elevation with a portion thereof broken away.

The grommet 440 can be best seen in FIG. 8 to be of annular shape, having a central opening 438 for receiving the rod 422, the grommet having an annular notch 462 in the outer edge thereof for receiving edge portions of the upper wall 442 of the housing 410.

In operation, the lower end 423 of the rod 422 will effectively stir the rocks for raising debris into the water inside the housing 410 which is then drawn away through the hose 26.

A hose-receiving tube 470 is disposed partially on the inside of the housing 410 and partially on the outside thereof by extending through an opening 472 in the housing and suitable sealing means 474 is placed between the tube 470 and the wall 476 of the housing.

The hose-receiving tube 470 can be short or long but is designed to be of a size to receive the hose 26 thereover so that the aquarium end of the hose pulls water from the interior of the housing 410 through the tube 470.

The housing wall 476 takes on a special shape as seen at 482, in order to hold the tube 470.

In operation, the housing 410 is placed against the rocks 414 which are stirred by the stirring rod 422, the upper end of which is held in the operator's hands as the housing 410 is pressed against the bottom rocks 414 of the aquarium. Debris-laden water in the housing 410 is drawn through the tube 470 and the hose 26 into the pump of FIG. 1.

Referring to FIG. 3, a device is there shown at 500 which will not be further described because it is not necessary to the operation of the other parts of this invention.

I claim:

1. A fish tank rock cleaning device comprising a housing with an open bottom to be rested on rock in the bottom of said aquarium, a stirring rod extended through said housing and moveable with respect to said housing for the stirring of said rock with an inner part of said rod by manipulating the outer part of said rod, a hose being attached to said housing at a point substantially spaced above said open bottom whereby said hose can be connected to a pump.

* * * * *